J. McGINNIS.
Corn-Planters.

No. 133,789.  Patented Dec. 10, 1872.

Witnesses:
John Becker.
W. A. Graham

Inventor:
Joshua McGinnis.
Per  Munn & Co
Attorneys.

UNITED STATES PATENT OFFICE.

JOSHUA McGINNIS, OF FRAZEYSBURG, OHIO, ASSIGNOR TO HIMSELF AND E. L. LEMERET, OF SAME PLACE.

IMPROVEMENT IN CORN-PLANTERS.

Specification forming part of Letters Patent No. 133,789, dated December 10, 1872.

*To all whom it may concern:*

Figure 1:
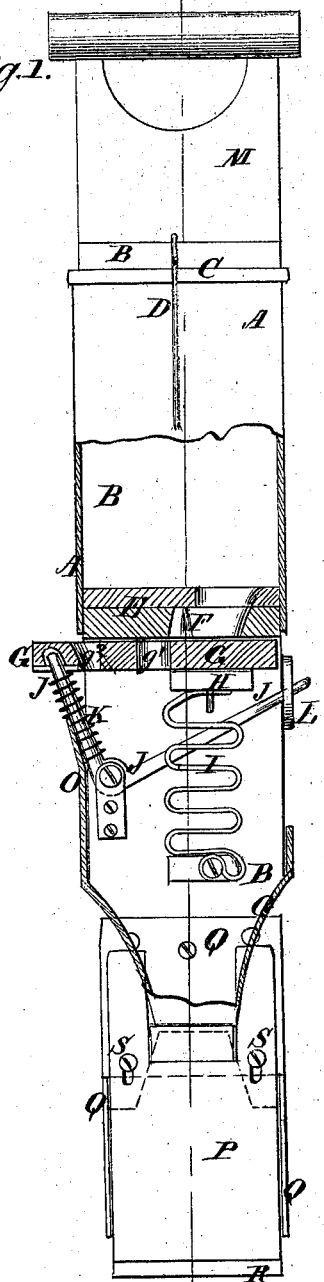
Figure 2:
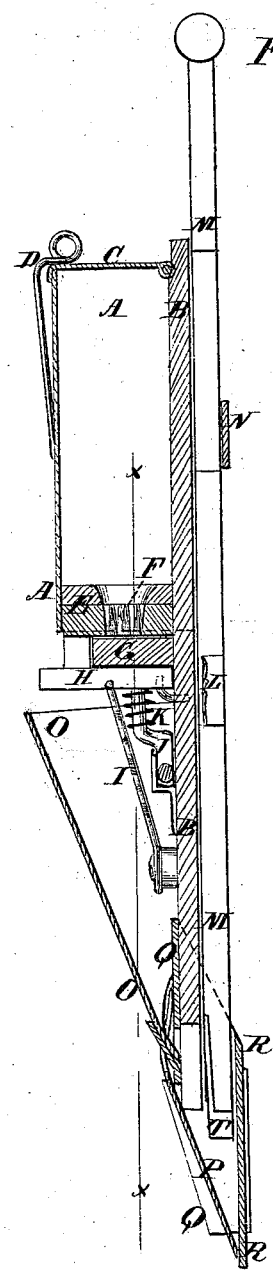

Be it known that I, JOSHUA McGINNIS, of Frazeysburg, in the county of Muskingum and State of Ohio, have invented a new and useful Improvement in Hand Seed-Planter, of which the following is a specification:

In the accompanying drawing, Figure 1 is a front view of my improved seed-planter, partly in section, through the line $x\ x$, Fig. 2. Fig. 2 is a detail vertical longitudinal section of the same taken through the line $y\ y$, Fig. 1.

Similar letters of reference indicate corresponding parts.

The invention consists in providing a dropper-slide support with a spring, and the dropper-slide with a recess in rear of the measuring-recess, for the purposes hereinafter fully described.

A represents the box to receive the grain, and which is attached to the board B. The box A is provided with a cover, C, which is kept in place by a spring-catch, D. The bottom E of the box A is made thick, and has a hole formed through it near one end to allow the corn or other seed to pass through to the dropping-slide. The lower part of the hole through the bottom E is enlarged upon the side toward the central line of the seed-box A, and has a brush, F, placed in said enlarged part to prevent any more seed passing out than enough to fill the hole in the dropping-slide. G is the dropping-slide, which moves back and forth in a square groove formed in the under side of the bottom E, and is held up in place by a block or plate, H, placed in a notch in the bottom E, and held up against the dropping-slide G by a coiled, zigzag, or other spring, I, one end of which is secured to the board B, and its other end rests against the under side of the block or plate H. In the dropping-slide G is formed a hole, $g^1$, to receive the seed from the hole in the bottom E and carry it out of said box A, the block or plate H keeping the seeds from dropping out of the hole $g^1$ before they have been carried to the proper position. The amount of seed dropped out at a time depends upon the thickness of the slide G. The block or plate H and spring I enable the slide G to be replaced by a thicker or thinner slide without changing any of the other parts. In the slide G, near its end, is formed a second hole, $g^2$, to receive any seeds that may pass through or beneath the brush F to prevent the machine from becoming clogged. J is an elbow-lever, which is pivoted at its angle to the board B at a suitable distance below the box A. The end of one arm of the lever J enters a hole in the under side of the slide G, near its end, so that the said slide may be operated by the movements of the said bent lever J. The end of the slide G is held up closely against the under side of the bottom E, when drawn outward by a spring, K, coiled upon the arm of the bent lever J, and the upper end of which rests against the under side of said slide. The other arm of the bent lever J enters an eye, L, attached to the board M, which is placed and slides longitudinally upon the rear side of the board B, where it is kept in place and its movement limited by a keeper, N, attached to the board B, and through which the board M passes.

As the seeds drop from the slide G they fall into the hopper-shaped spout O, by which they are conducted into the receiver formed by the spring-plate P, cap Q, and opener R. The cap Q overlaps the side edges of the boards B and M, and to its rear edges is secured the plate R, by which the ground is opened to receive the seed. The forward side of the cap Q is cut away to receive the spring-plate P, which is adjustably secured in place by screw S, and is so formed that its lower edge may press closely against the forward side of the opener-plate R to prevent the soil from passing up between the opener R and the spring-plate P, when the end of the planter is thrust into the ground. To the lower end of the sliding board M is attached a metallic plate, T, of such a thickness as to raise the spring-plate P when the board M slides downward to allow the seed to pass out.

Having thus described my invention, I claim as new and desire to secure by Letters Patent—

1. The dropper-slide support H, arranged upon a subjacent spring, I, as described, for the purpose of always holding different thicknesses of dropper-slide up to bottom of seed-box.

2. A seed-dropper slide, G, having the recess $g^2$ arranged in rear of measuring-recess $g^1$, as described, for the purpose of affording an escape of seed that get under the brush F, and are by it carried back to said recess $g^2$.

JOSHUA McGINNIS.

Witnesses:
    JOHN E. RUCKLE,
    OWEN FRANKS.